(12) United States Patent
Masel et al.

(10) Patent No.: US 9,012,345 B2
(45) Date of Patent: Apr. 21, 2015

(54) ELECTROCATALYSTS FOR CARBON DIOXIDE CONVERSION

(75) Inventors: Richard I. Masel, Champaign, IL (US); Amin Salehi-Khojin, Champaign, IL (US)

(73) Assignee: Dioxide Materials, Inc., Champaign, IL (US)

( * ) Notice: Subject to any disclaimer, the term of this patent is extended or adjusted under 35 U.S.C. 154(b) by 85 days.

(21) Appl. No.: 13/445,887

(22) Filed: Apr. 12, 2012

(65) Prior Publication Data

US 2013/0157174 A1 Jun. 20, 2013

Related U.S. Application Data

(60) Provisional application No. 61/499,225, filed on Jun. 21, 2011, provisional application No. 61/540,044, filed on Sep. 28, 2011.

(30) Foreign Application Priority Data

Mar. 25, 2011 (WO) ................ PCT/US2011/030098
Jul. 1, 2011 (WO) ................ PCT/US2011/042809

(51) Int. Cl.
*B01J 37/34* (2006.01)
*B01J 23/00* (2006.01)
(Continued)

(52) U.S. Cl.
CPC ............... *B01J 31/0275* (2013.01); *C25B 3/04* (2013.01)

(58) Field of Classification Search
USPC .............................. 502/150, 5, 100
See application file for complete search history.

(56) References Cited

U.S. PATENT DOCUMENTS

| 1,919,850 A | 7/1933 | Luscher |
| 2,511,198 A | 6/1950 | Engel |

(Continued)

FOREIGN PATENT DOCUMENTS

| CA | 1272180 A | 7/1990 |
| CA | 2821642 A1 | 6/2012 |

(Continued)

OTHER PUBLICATIONS

Kaneco, S. et al. "Effect of sodium cation on the electrochemical reduction of CO2 at a copper electrode in methanol", Journal of Solid State Electrochemistry 11 (2007), pp. 490-495.

(Continued)

*Primary Examiner* — James McDonough
(74) *Attorney, Agent, or Firm* — Corridor Law Group, P.C.

(57) ABSTRACT

Electrocatalysts for carbon dioxide conversion include at least one catalytically active element with a particle size above 0.6 nm. The electrocatalysts can also include a Helper Catalyst. The catalysts can be used to increase the rate, modify the selectivity or lower the overpotential of electrochemical conversion of $CO_2$. Chemical processes and devices using the catalysts also include processes to produce CO, $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$, or $(COO^-)_2$, and a specific device, namely, a $CO_2$ sensor.

16 Claims, 4 Drawing Sheets

(51) Int. Cl.
*B01J 25/00* (2006.01)
*B01J 29/00* (2006.01)
*B01J 31/00* (2006.01)
*B01J 31/02* (2006.01)
*C25B 3/04* (2006.01)

(56) References Cited

U.S. PATENT DOCUMENTS

| | | |
|---|---|---|
| 2,996,359 A | 8/1961 | Mossman et al. |
| 3,959,094 A | 5/1976 | Steinberg |
| 4,207,151 A | 6/1980 | Franke et al. |
| 4,240,882 A | 12/1980 | Ang et al. |
| 4,315,753 A | 2/1982 | Bruckenstein et al. |
| 4,474,652 A | 10/1984 | Brown et al. |
| 4,523,981 A | 6/1985 | Ang et al. |
| 4,545,872 A | 10/1985 | Sammells et al. |
| 4,595,465 A | 6/1986 | Ang et al. |
| 4,608,132 A | 8/1986 | Sammells |
| 4,608,133 A * | 8/1986 | Morduchowitz et al. ..... 205/440 |
| 4,609,440 A | 9/1986 | Frese, Jr. et al. |
| 4,609,441 A | 9/1986 | Frese, Jr. et al. |
| 4,620,906 A | 11/1986 | Ang |
| 4,668,349 A | 5/1987 | Cuellar et al. |
| 4,673,473 A | 6/1987 | Ang et al. |
| 4,701,437 A * | 10/1987 | Boxhoorn et al. ............ 502/348 |
| 4,756,807 A | 7/1988 | Meyer et al. |
| 4,771,708 A | 9/1988 | Douglass, Jr. |
| 4,789,442 A | 12/1988 | Nakagawa et al. |
| 4,818,353 A | 4/1989 | Langer et al. |
| 4,879,070 A | 11/1989 | Kent |
| 4,968,393 A | 11/1990 | Mazur et al. |
| 5,064,733 A | 11/1991 | Krist et al. |
| 5,071,526 A | 12/1991 | Pletcher et al. |
| 5,089,661 A | 2/1992 | Maspero et al. |
| 5,206,433 A | 4/1993 | Hohenschutz et al. |
| 5,284,563 A | 2/1994 | Fujihira et al. |
| 5,294,740 A | 3/1994 | Kiefer et al. |
| 5,334,759 A | 8/1994 | Lippert et al. |
| 5,382,332 A | 1/1995 | Fujihira et al. |
| 5,639,910 A | 6/1997 | Ikariya et al. |
| 5,709,789 A | 1/1998 | Shay et al. |
| 5,763,622 A | 6/1998 | Podszun et al. |
| 5,804,045 A | 9/1998 | Orillon et al. |
| 5,879,915 A | 3/1999 | Loubiere et al. |
| 5,928,806 A | 7/1999 | Olah et al. |
| 5,952,540 A | 9/1999 | Lee et al. |
| 6,024,855 A | 2/2000 | Sharifian et al. |
| 6,429,333 B1 | 8/2002 | Saari et al. |
| 6,660,680 B1 | 12/2003 | Hampden-Smith et al. |
| 6,706,657 B2 * | 3/2004 | Commereuc et al. ......... 502/164 |
| 6,713,649 B1 | 3/2004 | Hladiy et al. |
| 6,841,700 B2 | 1/2005 | Auer et al. |
| 6,849,764 B2 | 2/2005 | Gurkaynak et al. |
| 6,867,329 B2 | 3/2005 | Auer et al. |
| 6,906,222 B2 | 6/2005 | Slany et al. |
| 6,955,743 B2 | 10/2005 | Rousu et al. |
| 6,987,134 B1 | 1/2006 | Gagnon |
| 6,992,212 B2 | 1/2006 | Zehner et al. |
| 7,081,547 B2 | 7/2006 | Fujimoto et al. |
| 7,157,404 B1 | 1/2007 | Jun et al. |
| 7,241,365 B2 | 7/2007 | Auer et al. |
| 7,253,316 B2 | 8/2007 | Pastre et al. |
| 7,323,593 B2 | 1/2008 | Adami et al. |
| 7,351,860 B2 | 4/2008 | Adami et al. |
| 7,420,088 B2 | 9/2008 | Karl et al. |
| 7,459,590 B2 | 12/2008 | Olah et al. |
| 7,479,570 B2 | 1/2009 | Ogo et al. |
| 7,605,293 B2 | 10/2009 | Olah et al. |
| 7,608,743 B2 | 10/2009 | Olah et al. |
| 7,612,233 B2 | 11/2009 | Hauk et al. |
| 7,618,725 B2 | 11/2009 | Masel et al. |
| 7,704,369 B2 | 4/2010 | Olah et al. |
| 8,313,634 B2 * | 11/2012 | Bocarsly et al. .............. 205/440 |
| 8,592,633 B2 | 11/2013 | Cole et al. |
| 2004/0031685 A1 | 2/2004 | Anderson et al. |
| 2004/0072683 A1 * | 4/2004 | Kodas et al. .................. 502/224 |
| 2006/0096871 A1 | 5/2006 | Manoukian et al. |
| 2006/0234174 A1 | 10/2006 | Burrahm et al. |
| 2006/0235091 A1 | 10/2006 | Olah et al. |
| 2007/0036706 A1 | 2/2007 | Ogo et al. |
| 2007/0045125 A1 | 3/2007 | Hartvigsen et al. |
| 2007/0187247 A1 | 8/2007 | Lackner et al. |
| 2008/0039538 A1 | 2/2008 | Olah et al. |
| 2008/0103040 A1 | 5/2008 | Rodriguez et al. |
| 2008/0223727 A1 | 9/2008 | Oloman et al. |
| 2009/0014336 A1 * | 1/2009 | Olah et al. .................... 205/450 |
| 2009/0016948 A1 | 1/2009 | Young |
| 2009/0169452 A1 | 7/2009 | Constantz et al. |
| 2009/0289211 A1 | 11/2009 | Fujioka et al. |
| 2010/0132556 A1 | 6/2010 | Constantz et al. |
| 2010/0133120 A1 | 6/2010 | Varney et al. |
| 2010/0135865 A1 | 6/2010 | Constantz et al. |
| 2010/0137457 A1 | 6/2010 | Kaplan |
| 2010/0187123 A1 | 7/2010 | Bocarsly et al. |
| 2010/0193370 A1 | 8/2010 | Olah et al. |
| 2010/0276287 A1 | 11/2010 | Manoukian et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0226632 A1 | 9/2011 | Cole et al. |
| 2011/0237830 A1 | 9/2011 | Masel |
| 2012/0308903 A1 * | 12/2012 | Masel ........................... 429/409 |

FOREIGN PATENT DOCUMENTS

| | | |
|---|---|---|
| DE | 183856 C | 1/1906 |
| EP | 0012215 A | 6/1980 |
| EP | 0293230 A | 11/1988 |
| EP | 0323300 A | 7/1989 |
| GB | 2230782 A | 10/1990 |
| JP | 201217300 | 1/2012 |
| WO | 2008110830 A | 9/2008 |
| WO | 2010007602 A | 1/2010 |
| WO | 2010063626 A | 6/2010 |
| WO | 2011120021 A | 9/2011 |
| WO | 2012006240 A | 1/2012 |
| WO | 2013006711 | 1/2013 |

OTHER PUBLICATIONS

Kaneco, S. et al., "Carbon dioxide sequestration technology by electrochemical conversion at cadmium electrode in methanol under mild conditions", Photo/Electrochemistry & Photobiology in Environment, Energy and Fuel (2003), pp. 181-189.

Kaneco, S. et al., "Electrochemical reduction of carbon dioxide to ethylene at a copper electrode in methanol using potassium hydroxide and rubidium hydroxide supporting electrolytes", Electrochimica Acta 51 (2006), pp. 3316-3321.

Kaneco, S. et al., "Electrochemical reduction of carbon dioxide to ethylene with high Faradaic efficiency at a Cu electrode in CsOH/methanol", Electrochimica Acta 44 (1999), pp. 4701-4706.

Kaneco, S. et al., "Electrochemical reduction of CO2 in copper particle-suspended methanol", Chemical Engineering Journal 119 (2006), pp. 107-112.

Kaneco, S. et al., "Electrochemical reduction of CO2 to Methane at the Cu electrode in methanol with sodium supporting salts and its comparison with other alkaline salts", Energy & Fuels 20 (2006), pp. 409-414.

Kaneco, S. et al., "Photoelectrochemical reduction of CO2 at p-InP electrode in copper particle-suspended methanol", Chemical Engineering Journal 148 (2009), pp. 57-62.

Kinge, S. et al., "Dependence of CO oxidation on Pt nanoparticle shape: A shape-selective approach to the synthesis of PEMFC catalysts", Applied Organometallic Chemistry 22 (2008), pp. 49-54.

Kinoshita, K., "Particle size effects for oxygen reduction on highly dispersed platinum in acid electrolytes", Journal of the Electrochemical Society 137 (1990), pp. 845-848.

Koleli, F. et al., "Reduction of CO2 under high pressure and high temperature on Pb-granule electrodes in a fixed-bed reactor in aqueous medium", Applied Catalysis A—General 274 (2004), pp. 237-242.

(56) References Cited

OTHER PUBLICATIONS

Koper, M., "Structure sensitivity and nanoscale effects in electrocatalysis", Nanoscale 3 (2011), pp. 2054-2073.
Laitar, D.S. et al., "Efficient homogeneous catalysis in the reduction of CO2 to CO", Journal of the American Chemical Society 127 (2005), pp. 17196-17197.
Lee, C.W. et al., "Studies on suppression of hydrogen evolution reaction for zinc/air fuel cell", Material Science Forums 539-543 (2007), pp. 1427-1430.
Li, H. et al., "Development of a continuous reactor for the electro-reduction of carbon dioxide to formate—Part 1: Process variables", Journal of Applied Electrochemistry 36 (2006), pp. 1105-1115.
Li, H. et al., "Development of a continuous reactor for the electro-reduction of carbon dioxide to formate—Part 2: Scale-up", Journal of Applied Electrochemistry 37 (2007), pp. 1107-1117.
Li, W., "Electrocatalytic Reduction of CO2 to Small Organic Molecule Fuels on Metal Catalysts", Advances in CO2 Conversion and Utilization (2010), pp. 55-76.
Liu, Y. et al., "Observation of surface structural changes of Pt octahedron nanoparticles and its effect in electrocatalysis oxidation of methanol", Catalysis Communications 10 (2009), pp. 1244-1247.
Liu, Z. et al., "General rules for predicting where a catalytic reaction should occur on metal surfaces: A density functional theory study of C-H and C-O bond breaking/making on flat, stepped, and kinked metal surfaces", Journal of the American Chemical Society 125 (2003), pp. 1958-1967.
Lopez-Cudero, A. et al., "CO electrooxidation on carbon supported platinum nanoparticles: Effect of aggregation", Journal of Electroanalytical Chemistry 644 (2010), pp. 117-126.
Lukaszewski, M. et al., "Electrosorption of carbon dioxide on platinum group metals and alloys—a review", Journal of Solid State Electrochemistry 13 (2009), pp. 813-827.
Lukaszewski, M. et al., "Comparative EQCM study on electrooxidation of carbon oxides adsorption products on noble metals and their alloys. Polycrystalline Pd-based systems", Journal of Electroanalytical Chemistry 606 (2007), pp. 117-133.
Ma, J. et al., "A short review of catalysis for CO2 conversion", Catal. Today 148 (2009), pp. 221-231.
Magdesieva, T.V. et al., "Lutetium monophthalocyanine and diphthalocyanine complexes and lithium naphthalocyanine as catalysts for electrochemical CO2 reduction", Journal of the Electrochemical Society 150 (2003), pp. E608-E612.
Maillard, F. et al., "Influence of particle agglomeration on the catalytic activity of carbon-supported Pt nanoparticles in CO monolayer oxidation", Physical Chemistry Chemical Physics 7 (2005), pp. 385-393.
Maillard, F. et al., "Size effects on reactivity of Pt nanoparticles in CO monolayer oxidation: The role of surface mobility", Faraday Discussions 125 (2004), pp. 357-377.
Masel, R., "Chemical Kinetics and Catalysis", Wiley (2001), pp. 702-742.
Meiwes-Broer, K., "Work functions of metal clusters", Hyperfine Interactions 89 (1994), pp. 263-269.
Morris, A. et al., "Electrocatalytic carbon dioxide activation: The rate-determining step of pyridinium-catalyzed CO2 reduction", Chem. Sus. Chem, 4 (2011), pp. 191-196.
Narayanan, R. et al., "Catalysis with transition metal nanoparticles in colloidal solution: Nanoparticle shape dependence and stability", Journal of Physical Chemistry B 109 (2005), pp. 12663-12676.
Noda, H. et al., "Electrochemical reduction of carbon dioxide at various metal electrodes in aqueous potassium hydrogen carbonate solution", Bull. Chem. Soc. Japan 63 (1990), pp. 2459-2462.
Ogura, K. et al., "CO2 attraction by specifically adsorbed anions and subsequent accelerated electrochemical reduction", Electrochimica Acta 56 (2010), pp. 381-386.
Ogura, K. et al., "Reduction of CO2 to ethylene at three-phase interface effects of electrode substrate and catalytic coating", Journal of the Electrochemical Society 152 (2005), pp. D213-D219.
Ogura, K. et al., "Selective formation of ethylene from CO2 by catalytic electrolysis at a three-phase interface", Prepr. Pap.—Am. Chem. Soc., Div. Fuel Chem. 49 (2004), pp. 9-10.
Ohya, S. et al., "Electrochemical reduction of CO2 in methanol with aid of CuO and Cu2O", Catalysis Today 148 (2009), pp. 329-334.
Oloman, C. et al., "Electrochemical processing of carbon dioxide", Chem. Sus. Chem. 1 (2008), pp. 385-391.
O'Mahony, A.M. et al., "The electrochemical reduction of hydrogen sulfide on platinum in several room temperature ionic liquids", The Journal of Physical Chemistry C 112 (2008), pp. 7725-7730.
Pease, R.N. et al., "The catalytic combination of ethylene and hydrogen in the presence of metallic copper. III. Carbon monoxide as a catalyst poison", J. Am. Chem. Soc. 47 (1925), pp. 1235-1240.
Perez, E.R. et al., "In situ FT-IR and ex situ EPR analysis for the study of the electroreduction of carbon dioxide in N,N-dimethylformamide on a gold interface", Journal of Electroanalytical Chemistry 578 (2005), pp. 87-94.
Perez, J. et al., "Particle size effect for ethanol electro-oxidation on Pt/C catalysts in half-cell and in a single direct ethanol fuel cell", Journal of Electroanalytical Chemistry 654 (2011), pp. 108-115.
Photinon, K. et al., "Thick-Film carbon dioxide sensor via anodic adsorbate stripping technique and its structural dependence", Sensors 9 (2009), pp. 7203-7216.
Podlovchenko, B.I. et al., "Electroreduction of carbon dioxide on palladium electrodes at potentials higher than the reversible hydrogen potential", Journal of Electroanalytical Chemistry 373 (1994), pp. 185-187.
Popic, J.P. et al., "Reduction of carbon dioxide on ruthenium oxide and modified ruthenium oxide electrodes in 0.5 MNaHCO3", Journal of Electroanalytical Chemistry 421 (1997), pp. 105-110.
Qu, J. P. et al., "Electrochemical reduction of CO2 on RuO2/TiO2 nanotubes composite modified Pt electrode", Electrochimica Acta 50 (2005), pp. 3576-3580.
Raebiger, J.W. et al., "Electrochemical Reduction of CO2 to CO Catalyzed by a Bimetallic Palladium Complex", Organometallics 25 (2006), pp. 3345-3351.
Rakowski, M. et al., "Development of molecular electrocatalysts for CO2 reduction and H2 production/oxidation", Acc. Chem. Res. 42 (2009), pp. 1974-1982.
Ramirez, G. M. et al., "A supramolecular cobalt-porphyrin-modified electrode, toward the electroreduction of CO2", Journal of Coordination Chemistry 57 (2004), pp. 249-255.
Rezaei, B. et al., "Application of ionic liquids as an electrolyte additive on the electrochemical behavior of lead acid battery", Journal of Power Sources 187 (2009), pp. 605-612.
Rezaei, B. et al., "Effects of tetrabutylammonium hydrogen sulfate as an electrolyte additive on the electrochemical behavior of lead acid battery", Journal of Solid State Electrochemistry 12 (2008), pp. 1663-1671.
Rodriguez, P. et al., "Specific surface reactions for identification of platinum surface domains: Surface characterization and electrocatalytic tests", Electrochimica Acta 50 (2005), pp. 4308-4317.
Rosen, B. et al., "Ionic Liquid-Mediated Selective Conversion of CO2 to CO at Low Overpotentials", Science 334 (2011), pp. 643-644.
Saeki, T. et al., "Electrochemical reduction of CO2 with high current density in a CO2 + methanol medium at various metal electrodes", Journal of Electroanalytical Chemistry 404 (1996), pp. 299-302.
Saeki, T. et al., "Electrochemical reduction of liquid CO2. Drastic enhancement of current density", Journal of the Electrochemical Society 141 (1994), pp. L130-L132.
Scheijen, F. et al., "The electrooxidation of small organic molecules on platinum nanoparticles supported on gold: Influence of platinum deposition procedure", Journal of Solid State Electrochemistry 12 (2008), pp. 483-495.
Seshadri, G. et al., "A new homogeneous electrocatalyst for the reduction of carbon dioxide to methanol at low overpotential", J. Electroanalytical Chemistry 372 (1994), pp. 145-150.
Silvester, D.S. et al., "Electrochemical reduction of benzoic acid and substituted benzoic acids in some room temperature ionic liquids", The Journal of Physical Chemistry C 112 (2008), pp. 12966-12973.

(56) References Cited

OTHER PUBLICATIONS

Silvester, D.S. et al., "Electrochemistry in room temperature ionic liquids: A review and some possible applications", Z. Phys. Chem. 220 (2006), pp. 1247-1274.

Singh, P. et al., "Comparison of Oxygen Reduction Reaction at Silver Nanoparticles and Polycrystalline Silver Electrodes in Alkaline Solution", J. Phys. Chem. 116 (2012), pp. 10656-10663.

Smolinka, T. et al., "CO2 reduction on Pt electrocatalysts and its impact on H 2 oxidation in CO2 containing fuel cell feed gas—A combined in situ infrared spectroscopy, mass spectrometry and fuel cell performance study", Electrochimica Acta 50 (2005), pp. 5189-5199.

Smolinski, S. et al., "Effect of surface order on adsorption of sulfate ions on silver electrodes", Journal of Electroanalytical Chemistry 442 (1998), pp. 41-47.

Sobkowski, J. et al., "Interaction of sulfate ions with monocrystalline silver electrodes", Colloids Surfaces A: Physicochem. Eng. Aspects 134 (1998), pp. 39-45.

Solla-Gullon, J. et al., "CO monolayer oxidation on semi-spherical and preferentially oriented (1 0 0) and (1 1 1) platinum nanoparticles", Electrochemistry Communications 8 (2006), pp. 189-194.

Solla-Gullon, J. et al., "Shape dependent electrocatalysis", Annual Reports on the Progress of Chemistry—Section C 107 (2011), pp. 263-297.

Solla-Gullon, J. et al., "Shape-dependent electrocatalysis: Methanol and formic acid electrooxidation on preferentially oriented Pt nanoparticles", Physical Chemistry Chemical Physics 10 (2008), pp. 3689-3698.

Star, A. et al., "Nanoelectric carbon dioxide sensors", Advanced Materials 16 (2004), pp. 2049-2051.

Subramanian, K. et al., "Electrochemical membrane reactor for the reduction of carbon dioxide to formate", Journal of Applied Electrochemistry 37 (2007), pp. 255-260.

Sun, J. et al., "Hydroxyl-functionalized ionic liquid: a novel efficient catalyst for chemical fixation of CO2 to cyclic carbonate", Tetrahedron Letters 49 (2008), pp. 3588-3591.

Sung, Y.-E. et al., "Structure of chemisorbed sulfur on a Pt(III) electrode", Journal of the American Chemical Society 119 (1997), pp. 194-200.

Takahashi, I. et al., "Electrochemical reduction of CO2 at copper single crystal Cu(S)-[n(111) Ã—(111)] and Cu(S)-[n(110) Ã—(100)] electrodes", Journal of Electroanalytical Chemistry 533 (2002), pp. 135-143.

Tian, N. et al., "Direct electrodeposition of tetrahexahedral Pd nanocrystals with high-index facets and high catalytic activity for ethanol electrooxidation", Journal of the American Chemical Society 132 (2010), pp. 7580-7581.

Tian, N. et al., "Platinum metal catalysts of high-index surfaces: from single-crystal planes to electrochemically shape-controlled nanoparticles", Journal of Physical Chemistry C112 (2008), pp. 19801-19817.

Tian, N. et al., "Synthesis of tetrahexahedral platinum nanocrystals with high-index facets and high electro-oxidation activity", Science 316 (2007), pp. 732-735.

Udupa, K.S. et al., "Electrolytic reduction of carbon dioxide to formic acid", Electrochimica Acta 16 (1971), pp. 1593-1598.

Welton, T., "Room-Temperature Ionic Liquids. Solvents for Synthesis and Catalysis". Chem. Revs., vol. 99, No. 8 (1999), pp. 2071-2083.

Wong, W.L. et al., "A robust ionic liquid as reaction medium and efficient organocatalyst for carbon dioxide fixation", Chem. Sus. Chem. 1 (2008), pp. 67-70.

Written Opinion of the International Searching Authority issued on Sep. 26, 2012, in connection with PCT/US2011/030098.

Xu, X. et al., "Effects of imidazolium salts as cocatalysts on the copolymerization of CO2 with epoxides catalyzed by (salen)CrIIICl complex", Polymer 48 (2007), pp. 3921-3924.

Yan, T. et al., "Adsorption of CO2 on the rutile (110) surface in ionic liquid. A molecular dynamics simulation", J. Phys. Chem. C 113 (2009), pp. 19389-19392.

Yang, H. et al., "Electrochemical activation of carbon dioxide in ionic liquid: synthesis of cyclic carbonates at mild reaction conditions", Chem. Commun. (2002), pp. 274-275.

Yano, H. et al., "Particle-size effect of nanoscale platinum catalysts in oxygen reduction reaction: An electrochemical and 195Pt EC-NMR study", Physical Chemistry Chemical Physics 8, 4932-4939 (2006).

Yano, H. et al., "Selective electrochemical reduction of CO2 to ethylene at a three-phase interface on copper(I) halide-confined Cu-mesh electrodes in acidic solutions of potassium halides", Journal of Electroanalytical Chemistry 565 (2004), pp. 287-293.

Yano, J. et al., "Selective ethylene formation by pulse-mode electrochemical reduction of carbon dioxide using copper and copper-oxide electrodes", Journal of Solid State Electrochemistry 11 (2006), pp. 554-557.

Yano, M. et al., "Effects of additives in zinc alloy powder on suppressing hydrogen evolution", Journal of Power Sources 74 (1998), pp. 129-134.

Yoshizawa-Fujita, M. et al., "A new class of proton-conducting ionic plastic crystals based on organic cations and dihydrogen phosphate", Electrochemistry Communications 9 (2007), pp. 1202-1205.

Yu, D. et al., "Carboxylation of Terminal Alkynes with Carbon Dioxide Catalyzed by Poly(N-Heterocyclic Carbene)-Supported Silver Nanoparticles", Adv. Synth. Catal. 354 (2012), pp. 969-974.

Yuan, D. et al., "Electrochemical activation of carbon dioxide for synthesis of dimethyl carbonate in an ionic liquid", Electrochimica Acta 54 (2009), pp. 2912-2915.

Zhang, L. et al., "Electrochemical activation of CO2 in ionic liquid (BMIMBF4): synthesis of organic carbonates under mild conditions", Green Chemistry 10 (2008), pp. 202-206.

Zhang, S. et al., "Chiral ionic liquids improved the asymmetric cycloaddition of CO2 to epoxides", Green Chem. 11 (2009), pp. 935-938.

Zhang, Z. et al., "Hydrogenation of carbon dioxide is promoted by a task-specific ionic liquid", Angew. Chem. Int. Ed. 47 (2008), pp. 1127-1129.

Zhang, Z. et al., "Hydrogenation of CO2 to formic acid promoted by a diamine-functionalized ionic liquid", Chem. Sus. Chem. 2 (2009), pp. 234-238.

Zhao, G. et al., "Electrochemical reduction of supercritical carbon dioxide in ionic liquid 1-n-butyl-3-methylimidazolium hexafluorophosphate", Journal of Supercritical Fluids 32 (2004), pp. 287-291.

Zhou, W. et al., "Size effects in electronic and catalytic properties of unsupported palladium nanoparticles in electrooxidation of formic acid", Journal of Physical Chemistry B 110 (2006), pp. 13393-13398.

Zhu, A., "Supported cholinechloride/urea as a heterogeneous catalyst for chemical fixation of carbon dioxide to cyclic carbonates", Green Chemistry. vol. 9 (2007), pp. 169-172.

S. Ikeda, T. Takagi, and K. Ito, "Selective Formation of Formic Acid. Oxalic Add, and Carbon Monoxide by Electrochemical Reduction of Carbon Dioxide", Bull. Chem. Soc. Japan, vol. 60, pp. 2517-2522 (1987).

M. Aulice Scibioh and B. Viswanathan, "Electrochemical Reduction of Carbon Dioxide: A Status Report", Indian Natn. Sci. Acad., vol. 70, A, No. 3, pp. 407-462 (May 2004).

Third-Party Submissions Under 37 CFR 1.290, submitted on Sep. 17 and 18, 2013, in connection with co-owned U.S. Appl. No. 12/830,338, and Concise Description of Relevance for each of the references cited in the Third Party Submissions.

Arenz, M. et al., "The effect of the particle size on the kinetics of CO electrooxidation on high surface area Pt catalysts", Journal of the American Chemical Society 127 (2005), pp. 6819-6829.

Azuma, M. et al., "Electrochemical reduction of carbon dioxide on various metal, electrodes in low-temperature aqueous KHCO3 media", J. Electrochem. Soc. 137 (1990), pp. 1772-1778.

Barrosse-Antle, L. et al., "Reduction of carbon dioxide in 1-butyl-3-methylimidazolium acetate", Chem. Commun. (2009), pp. 3744-3746.

(56) References Cited

OTHER PUBLICATIONS

Begum, A. et al., "Electrocatalysis of CO2 reduction by ruthenium benzothiazole and bithiazole complexes", Electrochemistry Communications 9 (2007), pp. 2525-2528.
Bell, A.T., "Basic Research Needs: Catalysis for Energy", U.S. Department of Energy Report PNNL-17214 (2008), p. 69.
Blizanac, B. et al., "Oxygen Reduction on Silver Low-Index Single-Crystal in Alkaline Solution: Rotating Ring DiskAg (hkl)", J. Phys. Chem. 110 (2006), pp. 4735-4741.
Bregoli, L., "The influence of platinum crystallite size on the electrochemical reduction of oxygen in phosphoric acid", Electrochimica Acta 23 (1978), pp. 489-492.
Cahill, L. et al., "Investigation of proton dynamics and the proton transport pathway in choline dihydrogen phosphate using solid-state NMR", Physical Chemistry Chemical Physics 12 (2010), pp. 5431-5438.
Chandrasekaran, K. et al., "In-situ spectroscopic investigation of adsorbed intermediate radicals in electrochemical reactions: carbon dioxide CO2—on platinum", Surface Science 185 (1987), pp. 495-514.
Chaplin, R. et al., "Effects of process conditions and electrode material on reaction pathways for carbon dioxide electroreduction with particular reference to formate formation", Journal of Applied Electrochemistry 33 (2003), pp. 1107-1123.
Chen, Q. et al., "Role of surface defect sites: From Pt model surfaces to shape-controlled nanoparticles", Chemical Science 3 (2012), pp. 136-147.
Cherstiouk, O. et al., "Model approach to evaluate particle size effects in electrocatalysis: Preparation and properties of Pt nanoparticles supported on GC and HOPG", Electrochimica Acta 48 (2003), pp. 3851-3860.
Cheung, K.C. et al., "Electrocatalytic reduction of carbon dioxide by a polymeric film of rhenium tricarbonyl dipyridylamine", Journal of Organometallic Chemistry 694 (2009), pp. 2842-2845.
Chu, D. et al., "Fixation of CO2 by electrocatalytic reduction and electropolymerization in ionic liquid-H2O solution", Chem. Sus. Chem. 1 (2008), pp. 205-209.
Cole, E. et al., "Using a one-electron shuttle for the multielectron reduction of CO2 to methanol: kinetic, mechanism, and structural insights", J. Am. Chem. Soc. 132 (2010), pp. 11539-11551.
Danly, D., "Development and commercialization of the Monsanto electrochemical adiponitrile process", J. Electrochemical Soc. 131 (1984), pp. 435C-442C.
Davis, Jr., J.H. et al., "Commercially available salts as building blocks for new ionic liquids", ACS Symp. Ser. 856 (2003), pp. 100-107.
Delacourt, C. et al., "Design of an electrochemical cell making syngas (CO + H2-) from CO2 and H2O reduction at room temperature ", Journal of the Electrochemical Society 155 (2008), pp. B42-B49.
Delacourt, C. et al., "Mathematical modeling of a cation-exchange membrane containing two cations", Journal of the Electrochemical Society 155 (2008), pp. B1210-B1217.
Derien, S. et al., "Activation of carbon dioxide: nickel-catalyzed electrochemical carboxylation of diynes", J. Organic Chem. vol. 58. No. 9 (1993), pp. 2578-2588.
DeWulf, D.W. et al., "Electrochemical and surface studies of carbon dioxide reduction to methane and ethylene at copper electrodes in aqueous solutions", Journal of the Electrochemical Society 136 (1989), pp. 1686-1691.
DeWulf, D.W. et al., "The electrochemical reduction of CO2 to CH4 and C2H4 at Cu/Nafion electrodes (solid polymer electrolyte structures)", Catalysis Letters 1 (1988), pp. 73-80.
Dietz, H. et al., "Influence of substituted benzaldehydes and their derivatives as inhibitors for hydrogen evolution in lead/acid batteries", Journal of Power Sources 53 (1995), pp. 359-365.
Dube, P. et al., "Influence of adsorption processes on the CO2 electroreduction: An electrochemical mass spectrometry study", Journal of Electroanalytical Chemistry 582 (2005), pp. 230-240.
DuBois, D. in A. Bard, ed., "Encyclopedia of Electrochemistry", 7a, Springer (2006), pp. 202-225.
DuBois, D. et al., "Electrochemical reduction of carbon dioxide catalyzed by [Pd(triphosphine)(solvent)](BF4)2 complexes: synthetic and mechanistic studies", J. Am. Chem. Soc., vol. 113. No. 23 (1991), pp. 8753-8764.
Eggins, B.R. et al., "Improved yields of oxalate, glyoxylate and glycolate from the electrochemical reduction of carbon dioxide in methanol", Journal of Applied Electrochemistry 27 (1997), pp. 706-712.
Eggins, B.R. et al., "Voltammetry of carbon dioxide. Part 1. A general survey of voltammetry at different electrode materials in different solvents", J. Electroanalytical Chem. 148 (1983), pp. 17-24.
Fisher, B. et al., "Electrocatalytic reduction of carbon dioxide by using macrocycles of nickel and cobalt", J. Am. Chem. Soc., vol. 102, No. 24 (1980), pp. 7361-7363.
Franklin, T.C. et al., "The effect of quaternary ammonium salts on the anodic oxidation of ethanol", Surface Technology 24 (1985), pp. 143-155.
Fukuzumi, S.,"Bioinspired Energy Conversion Systems for Hydrogen Production and Storage", Eur. J. Inorg. Chem., vol. 2008. No. 9. (2008), pp. 1351-1362.
Furuya, N. et al., "High performance Ru—Pd catalysts for CO2 reduction at gas-diffusion electrodes", Journal of Electroanalytical Chemistry 431 (1997), pp. 39-41.
Gattrell, M. et al. "A review of the aqueous electrochemical reduction of CO2 to hydrocarbons at copper", Journal of Electroanalytical Chemistry 594 (2006), pp. 1-19.
Gattrell, M. et al., "Electrochemical reduction of CO2 to hydrocarbons to store renewable electrical energy and upgrade biogas", Energy Conversion Management 48 (2007), pp. 1255-1265.
Haerens, K. et al., "Electrochemical decomposition of choline chloride based ionic liquid analogues", Green Chemistry 11 (2009), pp. 1357-1365.
Himeda, Y., "Conversion of CO2 into formate by homogeneously catalyzed hydrogenation in water: tuning catalytic activity and water solubility through the acid-base equilibrium of the ligand", European Journal of Inorganic Chemistry (2007), pp. 3927-3941.
Hori, Y. et al., "Electrochemical evidence of intermediate formation of adsorbed carbon monoxide in cathodic reduction of carbon dioxide at a nickel electrode", Electrochimica Acta 35 (1990), pp. 1777-1780.
Hori, Y. et al., "Electrochemical reduction of carbon dioxide at various series of copper single crystal electrodes", Journal of Molecular Catalysis A: Chemical 199 (2003), pp. 39-47.
Hori, Y., "Electrochemical CO2 reduction on metal electrodes", Modern Aspects of Electrochemistry 42 (2008), pp. 89-189.
Hoshi, N. et al., "Electrochemical reduction of carbon dioxide at a series of platinum single crystal electrodes", Electrochimica Acta 45 (2000), pp. 4263-4270.
Hoshi, N. et al., "Electrochemical reduction of carbon dioxide on kinked stepped surfaces of platinum inside the stereographic triangle", Journal of Electroanalytical Chemistry 540 (2003), pp. 105-110.
Hoshi, N. et al., "Electrochemical reduction of CO2 on single crystal electrodes of Ag(111), Ag(100), and Ag(110)", Journal of Electroanalytical Chemistry 440 (1997), pp. 283-286.
Ikeda, S. et al., "Electrochemical reduction of carbon dioxide using gas diffusion electrodes loaded with fine catalysts", Nanoscience and Nanotechnology (2008), pp. 108-113.
Ikeda, S. et al., "Zinc ion effect on electrochemical reduction of carbon dioxide at zinc electrode in aqueous solutions", Electrochemistry (Tokyo) 67 (1999), pp. 27-33.
Innocent, B. et al., "Electro-reduction of carbon dioxide to formate on lead electrode in aqueous medium", Journal of Applied Electrochemistry 39 (2009), pp. 227-232.
International Search Report and Written Opinion of the International Searching Authority issued on Oct. 31, 2011, in connection with PCT/US2011/042809.
International Search Report issued on Jul. 6, 2011, in connection with PCT/2011/030098.

(56) References Cited

OTHER PUBLICATIONS

Jiang, T. et al., "Solvent-free synthesis of substituted ureas from CO2 and amines with a functional ionic liquid as the catalyst", Green Chem. 10 (2008), pp. 465-469.

Jitaru, M., "Electrochemical carbon dioxide reduction—Fundamental applied topics (Review)", Journal of the University of Chemical Technology and Metallurgy 42 (2007), pp. 333-344.

Kabbabi, A. et al., "Particle size effect for oxygen reduction and methanol oxidation on Pt/C inside a proton exchange membrane", Journal of Electroanalytical Chemistry 373 (1994), pp. 251-254.

International Search Report and Written Opinion issued on Feb. 15, 2013 in connection with PCT/US2012/043651.

D. Dubois, "Electrochemical Reactions of Carbon Dioxide", Encyclopedia of Electrochemistry, pp. 212 (2007).

International Search Report and Written Opinion issued on May 16, 2014 in connection with PCT/US2013/061506.

International Preliminary Report on Patentability issued on Jan. 9, 2014 in connection with International Application PCT/US2012/043651.

Urey, H. et al., "Some reactions of atomic hydrogen", Journal of the American Chem. Society 51 (1929), pp. 3286-3290.

Weiss, A. et al., "Formose sugars from formaldehyde", Applied Catalysis 1 (1981), pp. 237-246.

Idriss, H. et al., "Two routes to formaldehyde from formic acid on TiO2, (001) surfaces", Surface Science 348 (1996), pp. 39-48.

Kiss, G. et al., "Palladium-catalyzed reppe carbonylation", Chem. Rev. 101 (2001), pp. 3435-3456.

Jessop, P. et al., "Recent advances in the homogeneous hydrogenation of carbon dioxide", Coordination Chem. Rev. 248 (2004), pp. 2425-2442.

Gazsi, A. et al., "Decomposition and reforming of formic acid on supported Au catalysts: Production of CO-free H2", Journal of Physical Chem. C 115 (2011), pp. 15459-15466.

Sabatier, P. et al., "Chimie Organique.—Sur la decomposition catalytique de l 'acide formique", Comptes Rendus Hebdomadaires Des Seances De L'Academie Dessciences 152 (2011), pp. 1213-1215.

Deng, J. et al., "Linked strategy for the production of fuels via formose reaction", Scientific Reports 3 (2013), p. 1244.

International Search Report and Written Opinion issued on Jun. 17, 2014 in connection with PCT/US2014/018067.

Chinese Office Action issued on Aug. 5, 2014 in connection with Chinese Application No. 201180023851.2.

\* cited by examiner

US 9,012,345 B2

ELECTROCATALYSTS FOR CARBON DIOXIDE CONVERSION

CROSS-REFERENCE TO RELATED APPLICATIONS

This application is a continuation-in-part of U.S. patent application Ser. No. 12/830,338 filed Jul. 4, 2010, entitled "Novel Catalyst Mixtures," which claims priority benefits from U.S. Provisional Patent Application Ser. No. 61/317,955 filed Mar. 26, 2010, also entitled "Novel Catalyst Mixtures". This application is also related to and claims priority benefits from International Application No. PCT/US2011/030098 filed Mar. 25, 2011, entitled "Novel Catalyst Mixtures", which claims priority benefits from the '955 U.S. provisional application and the '388 U.S. application. This application is also related to and claims priority benefits from International Application No. PCT/US2011/042809 filed Mar. 25, 2011, entitled "Novel Catalyst Mixtures", which claims priority benefits from the '338 U.S. application, the '098 international application, U.S. Provisional Patent Application Ser. No. 61/484,072 filed May 9, 2011, and U.S. patent application Ser. No. 13/174,365 filed Jun. 30, 2011, all entitled "Novel Catalyst Mixtures". This application is also related to and claims priority benefits from U.S. Provisional Patent Application 61/499,225, filed Jun. 29, 2011, entitled "Low Cost Carbon Dioxide Sensors," and U.S. Provisional Patent Application 61/540,044, filed Sep. 28, 2011, entitled "On Demand Carbon Monoxide Generator For Therapeutic and Other Applications". Each of the above applications is hereby incorporated by reference herein in its entirety.

STATEMENT OF GOVERNMENT INTEREST

This invention was made, at least in part, with U.S. government support under U.S. Department of Energy Grant DE-SC0004453. The government has certain rights in the invention.

FIELD OF THE INVENTION

The field of the invention is catalysis and catalysts. The catalysts of this invention are applicable, for example, to the electrochemical conversion of carbon dioxide into useful products.

BACKGROUND OF THE INVENTION

There is a present need to decrease carbon dioxide ($CO_2$) emissions from industrial facilities. Over the years, a number of electrochemical processes have been suggested for the conversion of $CO_2$ into useful products. Processes for $CO_2$ conversion and the catalysts for them are discussed in U.S. Pat. Nos. 3,959,094, 4,240,882, 4,523,981, 4,545,872, 4,595,465, 4,608,132, 4,608,133, 4,609,440, 4,609,441, 4,609,451, 4,620,906, 4,668,349, 4,673,473, 4,711,708, 4,756,807, 4,818,353, 5,064,733, 5,284,563, 5,382,332, 5,457,079, 5,709,789, 5,928,806, 5,952,540, 6,024,855, 6,660,680, 6,987,134 (the '134 patent), 7,157,404, 7,378,561, 7,479,570, U.S. patent application 20080223727 (the '727 application) and papers reviewed by Hon (Modern Aspects of Electrochemistry, 42, 89-189, 2008) ("the Hon Review"), Gattrell, et al. (Journal of Electroanalytical Chemistry, 594, 1-19, 2006) ("the Gattrell review"), DuBois (Encyclopedia of Electrochemistry, 7a, 202-225, 2006) ("the DuBois review").

Generally an electrochemical cell contains an anode (50), a cathode (51) and an electrolyte (53) as indicated in FIG. 1. Catalysts are placed on the anode, and or cathode, and or in the electrolyte to promote desired chemical reactions. During operation, reactants or a solution containing reactants is fed into the cell. Then a voltage is applied between the anode and the cathode, to promote an electrochemical reaction.

When an electrochemical cell is used as a $CO_2$ conversion system, a reactant comprising $CO_2$, carbonate or bicarbonate is fed into the cell. A voltage is applied to the cell, and the $CO_2$ reacts to form new chemical compounds. Examples of cathode reactions in the Hori Review include:

$$CO_2 + 2e^- + 2H^+ \rightarrow CO + H_2O$$

$$CO_2 + 2e^- \rightarrow CO + CO_3^{2-}$$

$$CO_2 + H_2O + 2e^- \rightarrow CO + 2OH^-$$

$$CO_2 + 2H_2O + 4e^- \rightarrow HCO^- + 3OH^-$$

$$CO_2 + 2H_2O + 2e^- \rightarrow H_2CO + 2OH^-$$

$$CO_2 + H_2O + 2e^- \rightarrow (HCO_2)^- + OH^-$$

$$CO_2 + 2H_2O + 2e^- \rightarrow H_2CO_2 + 2OH-$$

$$CO_2 + 5H_2O + 6e^- \rightarrow CH_3OH + 6OH^-$$

$$CO_2 + 6H_2O + 8e^- \rightarrow CH_4 + 8OH^-$$

$$2CO_2 + 8H_2O + 12e^- \rightarrow C_2H_4 + 12OH^-$$

$$2CO_2 + 9H_2O + 12e^- \rightarrow CH_3CH_2OH + 12OH^-$$

$$2CO_2 + 6H_2O + 8e^- \rightarrow CH_3COOH + 8OH^-$$

$$2CO_2 + 5H_2O + 8e^- \rightarrow CH_3COO^- + 7OH^-$$

$$2CO_2 + 10H_2O + 14e^- \rightarrow C_2H_6 + 14OH^-$$

$$CO_2 + 2H^+ + 2e^- \rightarrow CO + H_2O, \text{ acetic acid, oxalic acid, oxylate}$$

$$CO_2 + 4H^+ + 4e^- \rightarrow CH_4 + O_2$$

where e– is an electron. The examples given above are merely illustrative and are not meant to be an exhaustive list of all possible cathode reactions.

Examples of reactions on the anode mentioned in the Hori Review include:

$$2O^{2-} \rightarrow O_2 + 4e-$$

$$2CO_3^{2-} \rightarrow O_2 + 2CO_2 + 4e-$$

$$4OH^- \rightarrow O_2 + 2H_2O + 4e-$$

$$2H_2O \rightarrow O_2 + 4H^+ + 4e-$$

The examples given above are merely illustrative and are not meant to be an exhaustive list of all possible anode reactions.

In the previous literature, catalysts comprising one or more of V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Sn, Tl, Pb, Bi, Sb, Te, U, Sm, Tb, La, Ce, and Nd have all shown activity for $CO_2$ conversion. Reviews include Hori (Modern Aspects of Electrochemistry, 42, 89-189, 2008) ("the Hori Review"), Gattrell, et al. (Journal of Electroanalytical Chemistry, 594, 1-19, 2006) ("the Gattrell review"), DuBois (Encyclopedia of Electrochemistry, 7a, 202-225, 2006) ("the DuBois review"), and the papers Li, et al. (Journal of Applied Electrochemistry, 36, 1105-1115, 2006, Li, et al. (Journal of Applied Electrochemistry, 37, 1107-1117, 2007, and Oloman, et al. (ChemSus-Chem, 1, 385-391, 2008) ("the Li and Oloman papers"). and references therein.

The results in the Hori Review show that the conversion of $CO_2$ is only mildly affected by solvent unless the solvent also acts as a reactant. Water can act like a reactant, so reactions in water are different than reactions in non-aqueous solutions. But the reactions are the same in most non-aqueous solvents, and importantly, the overpotentials are almost the same in water and in the non-aqueous solvents.

The catalysts have been in the form of either bulk materials, supported particles, collections of particles, small metal ions or organometallics. Still, according to Bell (A. Bell. Ed, Basic Research Needs, Catalysis For Energy, US Department Of Energy Report PNNL17712, 2008) ("the Bell Report") "The major obstacle preventing efficient conversion of carbon dioxide into energy-bearing products is the lack of catalyst" with sufficient activity at low overpotentials and high electron conversion efficiencies.

The overpotential is associated with lost energy of the process, and so the overpotential should be as low as possible. Yet, according to The Bell Report "Electron conversion efficiencies of greater than 50 percent can be obtained, but at the expense of very high overpotentials". This limitation needs to be overcome before practical processes can be obtained.

A second disadvantage of many of the catalysts is that they also have low electron conversion efficiency. Catalyst systems are considered practical where electron conversion is over 50%.

In U.S. patent application Ser. No. 12/830,338 (published as US 2011/0237830), and Ser. No. 13/174,365 (not yet published), and in International Application No. PCT/US2011/030098 (published as WO 2011/120021) and PCT/US2011/0042809 (published as WO 2012/006240) disclose that a catalyst mixture containing an active metal and a Helper Catalyst could catalyze $CO_2$ conversions with low overpotential and high electron conversion efficiency. However, the catalysts disclosed in these patent applications showed a lower activity than was desired.

The examples above consider applications for $CO_2$ conversion, but the present electrocatalysts overcome limitations of other systems. For example, some commercial $CO_2$ sensors use an electrochemical reaction to detect the presence of $CO_2$. At present, these sensors require over 1-5 watts of power, which is too high for portable sensing applications.

SUMMARY OF THE INVENTION

The invention provides a novel catalyst mixture that can overcome one or more of the limitations of low rates, high overpotentials and low electron conversion efficiencies (namely, selectivities), low rates for catalytic reactions and high power for sensors. The catalyst mixture includes at least one Catalytically Active Element in the form of supported or unsupported particles wherein the particles have an average particle size (as defined below) between about 0.6 nm and 100 nm, preferably between 0.6 nm and 40 nm, and most preferable between 0.6 nm and 10 nm.

The invention is not limited to catalysts for $CO_2$ conversion. In particular, catalysts that include Catalytically Active Elements and Helper Catalysts might enhance the rate of a wide variety of chemical reactions. Reaction types include: homogeneously catalyzed reactions, heterogeneously catalyzed reactions, chemical reactions in chemical plants, chemical reactions in power plants, chemical reactions in pollution control equipment and devices, chemical reactions in fuel cells, and chemical reactions in sensors. The invention includes all of these examples. The invention also includes processes using these catalysts.

DETAILED DESCRIPTION OF EMBODIMENT(S)

Figure 1:
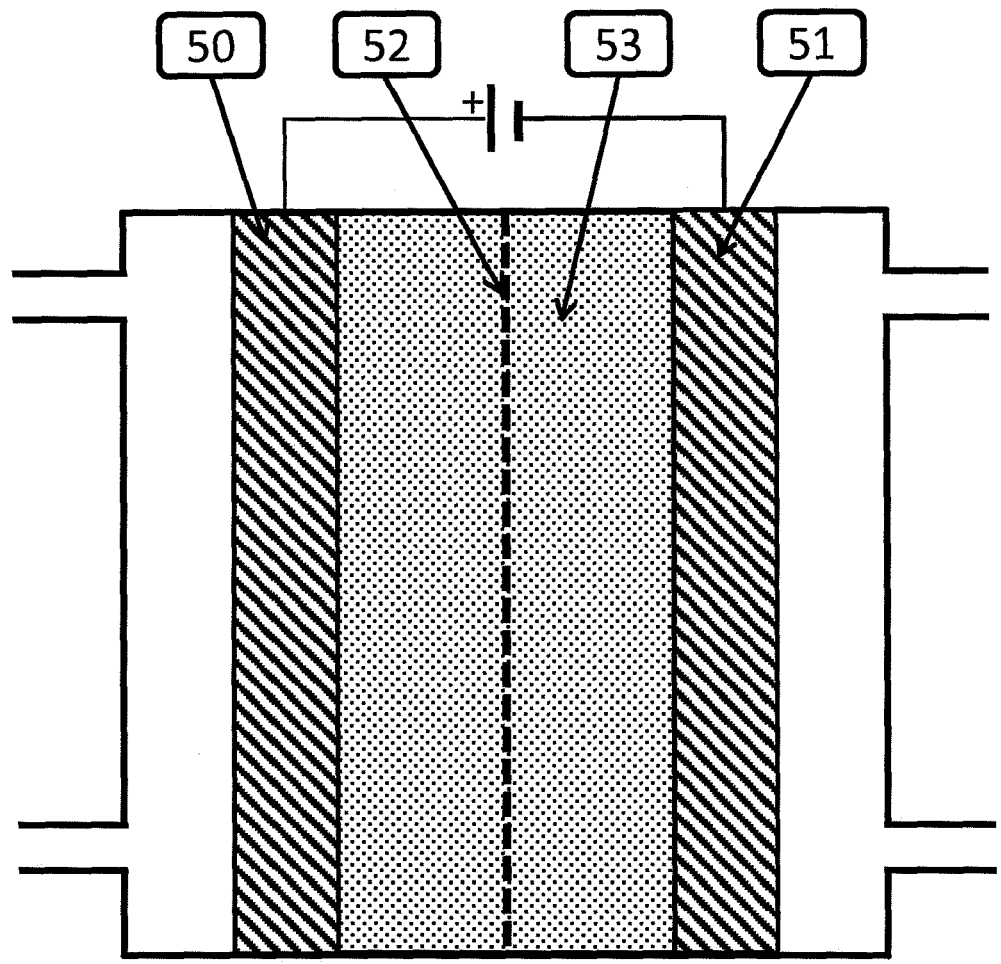
FIG. 1 is a diagram of a typical electrochemical cell.

The invention disclosed herein is not limited to the particular methodology, protocols, and reagents described herein, as these can vary as persons familiar with the technology involved here will recognize. The terminology employed herein is used for the purpose of describing particular embodiments only, and is not intended to limit the scope of the invention. As used herein and in the appended claims, the singular forms "a," "an," and "the" include the plural reference unless the context clearly dictates otherwise. Thus, for example, a reference to "a linker" is a reference to one or more linkers and equivalents thereof known to persons familiar with the technology involved here.

Unless defined otherwise, all technical and scientific terms used herein have the same meanings as commonly understood by persons familiar with the technology involved here. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as persons familiar with the technology involved here would recognize, even if not explicitly stated herein.

Any numerical value ranges recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32, and so on, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the invention are defined specifically. Particular methods, devices, and materials are described, although any methods and materials similar or equivalent to those described herein can be used in the practice or testing of the invention. All references referred to herein are incorporated by reference herein in their entirety.

Definitions

The term "electrochemical conversion of $CO_2$," as used here refers to any electrochemical process where carbon dioxide, carbonate, or bicarbonate is converted into another chemical substance in any step of the process.

The term "CV" as used here refers to a cyclic voltammogram or cyclic voltammetry.

The term "Overpotential" as used here refers to the potential (voltage) difference between a reaction's thermodynamically determined reduction or oxidation potential and the potential at which the event is experimentally observed.

The term "Cathode Overpotential" as used here refers to the overpotential on the cathode of an electrochemical cell.

The term "Anode Overpotential" as used here refers to the overpotential on the anode of an electrochemical cell.

The term "Electron Conversion Efficiency" refers to selectivity of an electrochemical reaction. More precisely, it is defined as the fraction of the current that is supplied to the cell that goes to the production of a desired product.

The term "Catalytically Active Element" as used here refers to any chemical element that can serve as a catalyst for the electrochemical conversion of $CO_2$.

The term "Helper Catalyst" refers to any organic molecule or ion, or a mixture of organic molecules and or ions, that does at least one of the following:
(a) Speeds up a chemical reaction or
(b) Lowers the overpotential of the reaction without being substantially consumed in the process.

The term "Active Element, Helper Catalyst Mixture" refers to any mixture that includes one or more Catalytically Active Element(s) and at least one Helper Catalyst The term "Ionic Liquid" refers to salts or ionic compounds that form stable liquids at temperatures below 200° C.

The term "Deep Eutectic Solvent" refers to an ionic solvent that includes a mixture which forms a eutectic with a melting point lower than that of the individual components.

The term "EMIM" refers to 1-ethyl-3-methylimidazolium cations.

The term "EMIM-BF4" refers 1-ethyl-3-methylimidazolium tetrafluoroborate.

The term "Particle Size" refers to the average diameter of the catalytically active element particles in a catalyst or metal powder as determined by any of the following methods: x-ray line broadening or surface area measurements as described in section [0089]. The term "QRE" refers to a quasi-reference electrode.

The term "Ag-QRE" refers to a silver quasi reference electrode.

The term "potential of the peak" refers to the potential where the absolute value of the current is maximized.

Specific Description

The invention relates generally to Active Element, Helper Catalyst Mixtures where the mixture does at least one of the following:
Speeds up a chemical reaction, or
Lowers the overpotential of the reaction,
without being substantially consumed in the process.
For example such mixtures can lower the overpotential for $CO_2$ conversion to a value less than the overpotentials seen when the same Catalytically Active Element is used without the Helper Catalyst.

U.S. patent application Ser. No. 12/830,338 (published as US 2011/0237830), and Ser. No. 13/174,365 (not yet published), and in International Application No. PCT/US2011/030098 (published as WO 2011/120021) and PCT/US2011/042809 (published as WO 2012/006240) disclose that a catalyst mixture containing a Catalytically Active Metal and a Helper Catalyst could catalyze $CO_2$ conversions with low overpotential and high electron conversion efficiency. Active Metals included one or more of V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Sn, Tl, Pb, Bi, Sb, Te, U, Sm, Tb, La, Ce, and Nd. Examples of Helper Catalysts included one or more of phosphines, imidazoliums, pyridiniums, pyrrolidiniums, phosphoniums, sulfoniums, prolinates, methioninates, cholines, acetylcholines, alanines, aminoacetonitriles, methylammoniums, arginines, aspartic acids, threonines, chloroformamidiniums, thiouroniums, quinoliniums, pyrrolidinols, serinols, benzamidines, sulfamates, acetates, carbamates, triflates, and cyanides.

Of course, the '338 U.S. application, the '365 U.S. application, the '098 international application and the '809 international application disclose that not every substance listed above will act as a Helper Catalyst. In general, one can determine whether a given substance S is a Helper Catalyst for a reaction R catalyzed by an active metal M as follows:

Fill a standard 3 electrode electrochemical cell with the electrolyte commonly used for reaction R. Common electrolytes such as 0.1 M sulfuric acid or 0.1 M KOH in water can often be used.

Mount the active metal on the working electrode in the 3 electrode electrochemical cell, with an appropriate counter electrode.

Run several CV cycles to clean the active metal.

Measure the reversible hydrogen electrode (RHE) potential in the electrolyte.

Load the reactants for the reaction R into the cell, and measure a CV of the reaction R, noting the potential of the peak associated with the reaction R.

Calculate V1=the difference between the onset potential of the peak associated with the reaction R and RHE.

Calculate V1A=the difference between the potential of the peak associated with the reaction R and RHE.

Add 0.0001 to 99.9999% of the substance S to the electrolyte.

Measure RHE in the reaction with Helper Catalyst.

Measure the CV of reaction R again, noting the potential of the peak associated with the reaction R.

Calculate V2=the difference between the onset potential of the peak associated with the reaction R and RHE.

Calculate V2A=the difference between the potential of the peak associated with the reaction R and RHE.

If V2<V1 or V2A<V1A at any concentration of the substance S between 0.0001 and 99.9999%, the substance S is a Helper Catalyst for the reaction.

Further, the Helper Catalyst could be in any one of the following forms: (i) a solvent for the reaction; (ii) an electrolyte; (iii) an additive to any component of the system; or (iv) something that is bound to at least one of the catalysts in a system. These examples are meant for illustrative purposes only, and are not meant to limit the scope of the invention.

The catalyst disclosed in '338 U.S. application, the '365 U.S. application, the '098 international application and the '809 international application allowed $CO_2$ to be converted to useful products at low overpotentials and high electron conversion efficiencies. In particular, an EMIM silver catalyst, with 100 nm silver particles, allowed $CO_2$ to be converted with an electron conversion efficiency as high as 99%, and an overpotential as small as 0.17 V. Unfortunately, the silver/EMIM catalysts disclosed in the '338 U.S. application, the '365 U.S. application, the '098 international application and the '809 international application had a lower catalytic activity than was desired.

In the foregoing applications, new catalyst formulations are disclosed that maintain the ability to convert $CO_2$ with a high electron conversion efficiency and low overpotential, but also shows an improved specific catalytic activity. The catalyst was prepared by modifying the structure of the silver so it is more active. The catalyst can be in the form of supported or unsupported metal particles wherein the average particle size is below about 100 nm, preferably between 0.6 nm and 40 nm, more preferably between 0.6 nm and 20 nm, and most preferably between 0.6 nm and 10 nm.

In this context, the particle sizes can be determined by one or more of microscopy, x-ray line broadening, chemisorption, or small x-ray scattering. For example, one might measure the x-ray diffraction pattern of the catalysts, determine 13 the width of the diffraction line at some angle θ, and then calculate the particle size, D, from the Scherrer equation:

$$D = \frac{0.9 \lambda}{\beta \cos(\theta)}$$

where $\lambda$ is the wavelength of the x-ray beam.

Chemisorption can alternately be used to measure the Sg, the surface area of the active element per unit mass, and then calculate the particle size from the formula $$D = \frac{5}{S_g \rho}$$

where $\rho$ is the bulk density of the active element.

The invention specifically includes any catalyst with a particle size between 0.6 nm and 100 nm measured by any of x-ray line broadening, chemisorption, or small x-ray scattering.

Example 1

An Illustration of the Effects of Particle Size on $CO_2$ Conversion on a Silver/EMIM Catalyst Catalysts Tested This example illustrates the effect of silver particle size on the rate of $CO_2$ conversion on an EMIM-BF4 (Sigma Aldrich, St Louis Mo.) coated silver catalyst.

Experimental

During the experiments, a silver ink was deposited onto a silver rotating disk electrode (Pine Instruments, Grove City, Pa.). In the first experiment, the silver electrode was polished, and a CV was run as described in paragraph [0099][0102] below. Subsequent experiments were run by depositing one of i) 200 nm silver (Sigma Aldrich, St Louis, Mo.) ii) 100 nm silver (Sigma Aldrich, St Louis, Mo.) iii) 20-40 nm silver (Sigma Aldrich, St Louis, Mo.) vi) 5 nm (UT Dots, Champaign Ill.) v) 0.67 nm (Purest Colloids, Westampton, N.J.) onto the silver electrode and running the CV as in the fourth paragraph below.

In the case of 500-1000 nm, 100 nm, 20-40 nm silver a silver ink is prepared by mixing 5.6 mg of silver particles with 1 ml deoxygenated Millipore water. The catalyst is applied on the surface of the rotating electrode by adding 60 μL of the ink to the surface and allowing the water to evaporate under ambient temperature for 60 minutes. In order to ensure the quality of the measurements, special attention is paid to the material cleaning and solution purity.

The 10 nm arrived suspended in an organic solution, and so this solution was applied to the silver electrode, and subsequently heated in air at 85° C. for 3 hours to remove any residual organics The 0.6 nm particles arrived suspended in distilled water, so they were used as received.

The counter electrode is made by attaching a 25×25 mm platinum mesh (size 52) to a 5 inch platinum wire (99.9%, 0.004 inch diameter). A silver quasi-reference electrode was used. The electrolytes were first loaded into the glass cell and then purged with dry argon (99.99%) for two hours in order to remove oxygen from the electrolytes. Prior to each experiment, a 20-40 linear sweep cyclic voltammogram at 75 mVs$^{-1}$ is taken with the range between −2 V and 0 vs. Ag-QRE in order to condition the electrodes and remove oxides from the surfaces. Then several cycles were performed at 10 mVs$^{-1}$ before taking the final cycle to insure that the CV had stabilized (that is, any "dirt" or other material is removed from the surfaces). Finally, cleaning and stabilizing CV cycles were performed at 10 mVs$^{-1}$. Then $CO_2$ was bubbled in the solution at 1 atm pressure for 20 minutes. Cyclic voltammetry was conducted again at a sweep rate of 10 mV/s in the range from −2 V to 0 V vs. Ag-QRE.

Results: Water Electrolysis

Figure 2:
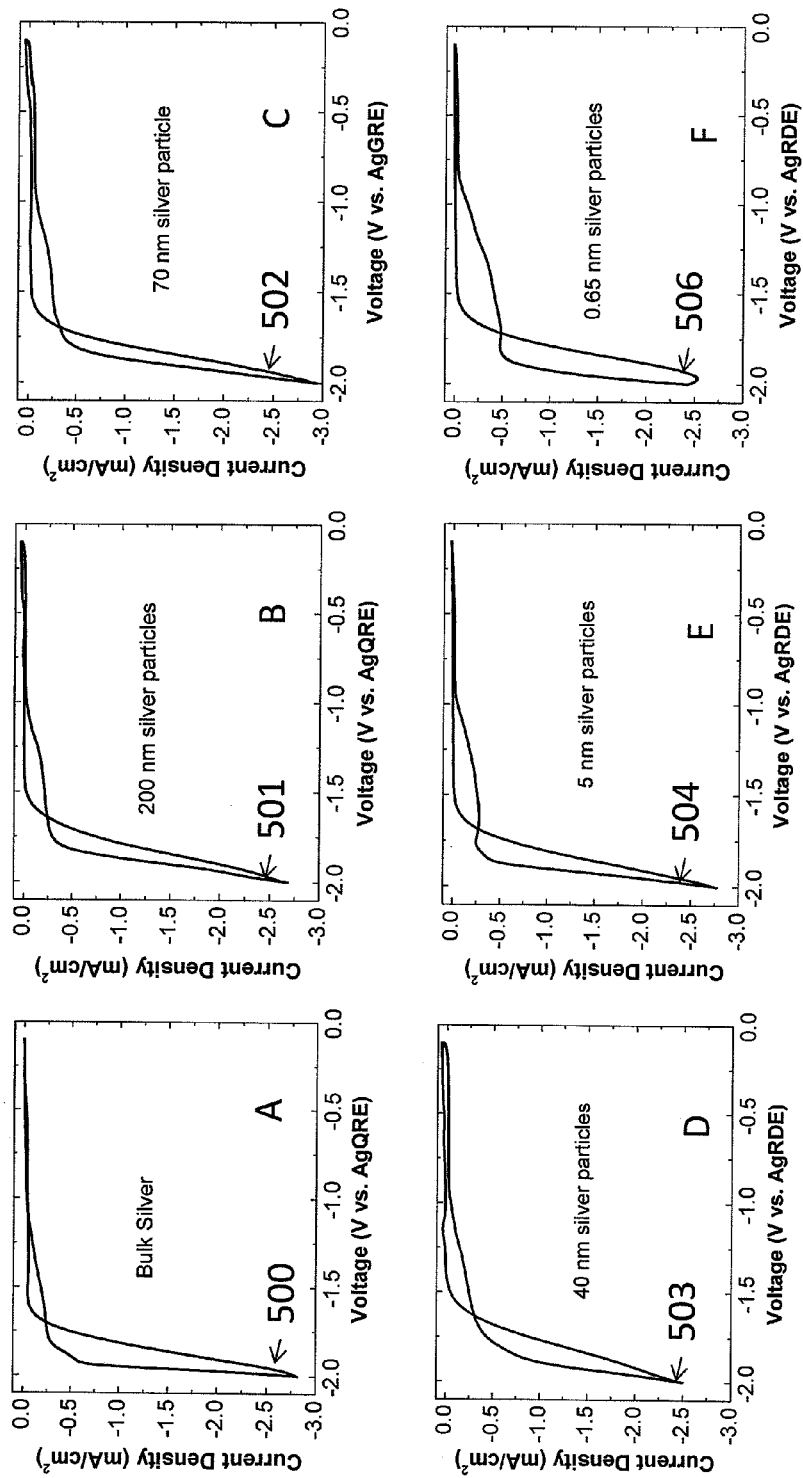
FIG. 2 illustrates how the cyclic voltammogram (CV) of electrochemical water reduction varies with the average particle size of the Catalytically Active Element silver on the cathode: (A) bare silver electrode, (B) electrode covered by nominally 200 nm silver particles, (C) electrode covered by nominally 100 nm silver particles, (D) electrode covered by nominally 20-40 nm silver particles, (E) electrode covered by 5 nm silver particles, and (F) electrode covered by 0.67 nm silver particles. The numeric designations 500-505 indicate the positions of the hydrogen peak in the figures. All of the CV's are reported as the current divided by the electrochemical surface area of the particles

FIG. 2 shows how the CV of water varies with particle size. One finds that there is very little variation in the catalytic activity of silver, in agreement with the literature reviewed in a recent paper, M. T. M. Koper, *Structural sensitivity and nanostructure effects in electrocatalysis*, Nanoscale 3, 2054 (2011) ("the Koper Paper")

Results: $CO_2$

Figure 3:
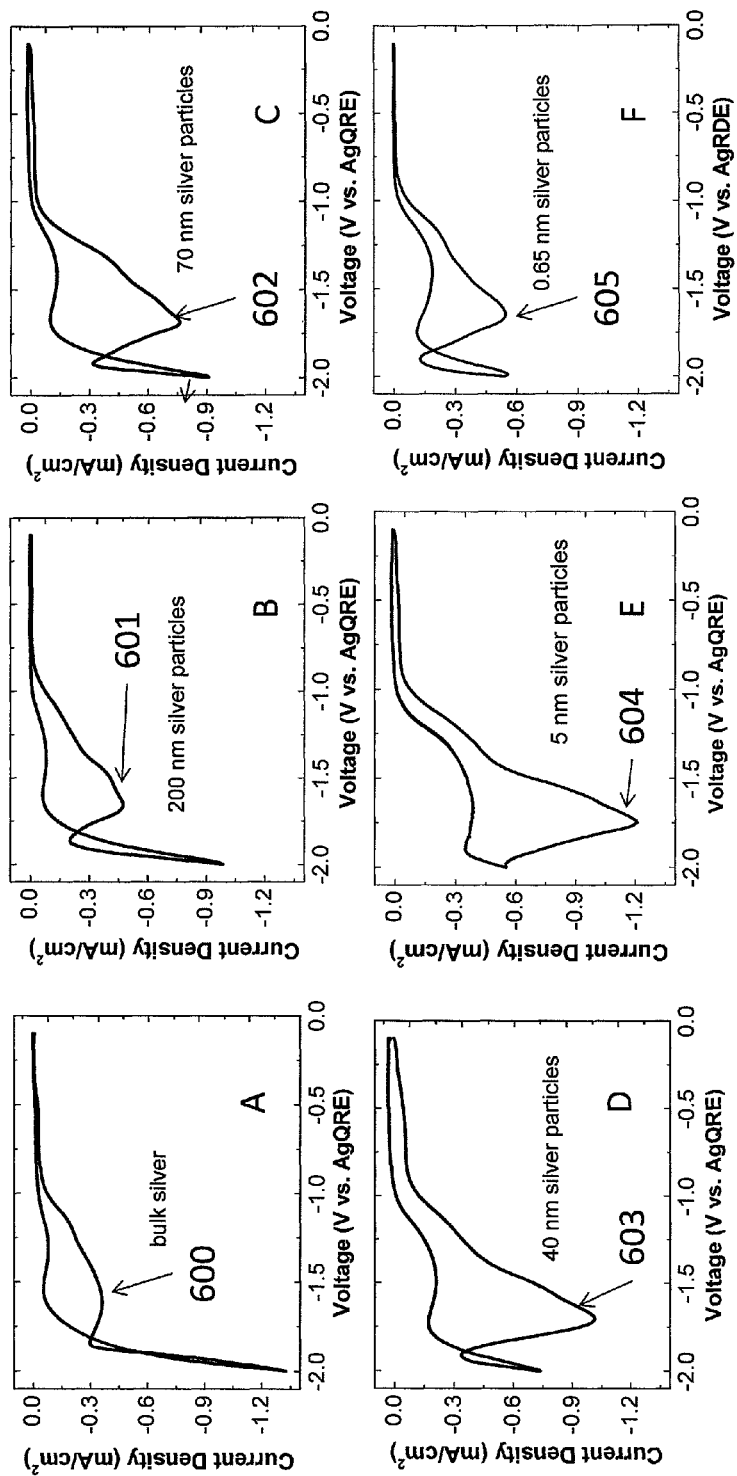
FIG. 3 illustrates how the CV changes in FIG. 2 when $CO_2$ is added to the reaction: (A) bare silver electrode, (B) electrode covered by nominally 200 nm silver particles, (C) electrode covered by nominally 100 nm silver particles, (D) electrode covered by nominally 20-40 nm silver particles, (E) electrode covered by 5 nm silver particles, and (F) electrode covered by 0.67 nm silver particles. The numeric designations 600-605 indicate the $CO_2$ reduction peak in the figures. All of the CV's are reported as the current divided by the electrochemical surface area of the particles
Figure 4:
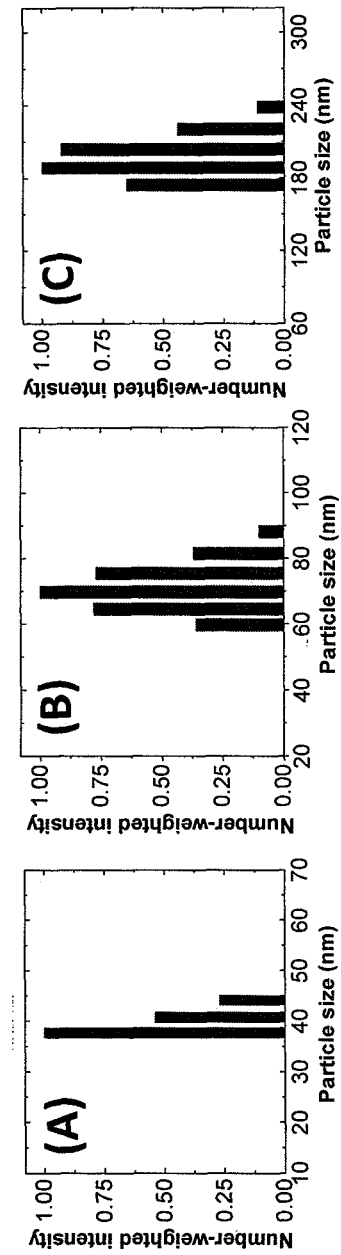
FIG. 4 illustrates particle size distribution of the (A) nominally 20-40 nm silver particles, (B) nominally 100 nm silver particles, and (C) nominally 200 nm silver particles as measured by dynamic light scattering. The nominally 20-40 nm particles have an average size of 35 nm. The nominally 100 nm particles have an average size of 70 nm and the nominally 200 nm particles have an average size of 190 nm.

FIG. 3 shows how the CV changes when $CO_2$ is added to the electrochemical cell. Notice that $CO_2$ conversion peaks, labeled 100, 101, 102, 103, 104, 105 and 106 are observed. The $CO_2$ conversion peaks grow as one decreases the particle size from 1000-10 nm, but then we observed the opposite effect, where the $CO_2$ peak shrinks moving from 10 nm to 0.6 nm. Evidently, there is an optimal particle size somewhere between 0.6 and 100 nm. The optimal size is probably between 0.6 and 40 nm, most probably between 0.6 and 20 nm.

The result above shows that unsupported silver catalysts have an optimal size between 0.6 and 100 nm. Those trained in the art know that if a reaction is structure sensitive on an unsupported catalyst, or single crystal, it will also show structure sensitivity on a supported catalyst. Further, the Korper Paper suggests that if a reaction is structure sensitive on one transition metal, it will also be structure sensitive on most other transition metals. In particular the optimum particle size is very similar on most transition metals. Therefore, we conclude that V, Cr, Mn, Fe, Co, Ni, Cu, Zr, Nb, Mo, Ru, Rh, Pd, Ag, Cd, W, Re, Ir, Pt, Au, Hg, Pb, Bi, electrocatalysts for $CO_2$ conversion should have an optimal size between 0.6 and 100 nm.

The examples given above are merely illustrative and are not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

The disclosures of all references and publications cited above are expressly incorporated by reference in their entireties to the same extent as if each were incorporated by reference individually.

What is claimed is:

1. An electrocatalyst comprising at least one catalytically active element, wherein:
   said catalytically active element is in the form of particles supported on an electrically conductive support or unsupported particles,
   the particles of the at least one catalytically active element have an average size between 0.6 nm and 100 nm,
   the at least one catalytically active element is in electrical contact with an electrode of an electrochemical cell or device, and
   the electrocatalyst is capable of converting $CO_2$ to a carbon-containing reaction product.

2. The electrocatalyst of claim 1, wherein the average particle size is between 0.6 nm and 40 nm.

3. The electrocatalyst of claim 2 wherein the average particle size is between 0.6 nm and 20 nm.

4. The electrocatalyst of claim 3 wherein the average particle size is between 0.6 nm and 10 nm.

5. The electrocatalyst of claim 1 further comprising a Helper Catalyst.

6. The electrocatalyst of claim 1 wherein said catalytically active element comprises at least one of V, Cr, Mn, Fe, Co, Ni, Cu, Zr, Nb, Mo, Ru, Rh, Pd, Ag, Cd, W, Re, Ir, Pt, Au, Hg, Pb, and Bi.

7. The electrocatalyst of claim 1 wherein said products comprise at least one of the following: CO, $HCO^-$, $H_2CO$, $(HCO_2)^-$ $H_2CO_2$, $CH_3OH$, $CH_4$, $C_2H_4$, $CH_3CH_2OH$, $CH_3COO^-$, $CH_3COOH$, $C_2H_6$, $(COOH)_2$ and $(COO^-)_2$.

8. The electrocatalyst of claim 1 wherein said reaction products comprising one of CO or HCOOH.

9. The electrocatalyst of claim 1 wherein said catalytically active element comprises at least one of Pt, Pd, Au, Ag, Cu, Ni, Fe, Co, Ru and Rh.

10. The electrocatalyst of claim 1 wherein said catalytically active element comprises silver.

11. The electrocatalyst of claim 5 wherein said Helper Catalyst comprises at least one of an organic cation and an organic anion.

12. The electrocatalyst of claim 5 wherein said Helper Catalyst comprises at least one of phosphines, imidazoliums, pyridiniums, pyrrolidiniums, phosphoniums, sulfoniums, prolinates, and methioninates.

13. The electrocatalyst of claim 5 wherein said Helper Catalyst comprises cholines.

14. The electrocatalyst of claim 5 wherein said Helper Catalyst comprises 1-ethyl-3-methylimidazolium cations.

15. The electrocatalyst of claim 5 wherein said Helper Catalyst comprises tetrafluoroborate anions.

16. The electrocatalyst of claim 5 wherein said Helper Catalyst is one of a solvent, an electrolyte and an additive.

* * * * *